United States Patent
Scipio et al.

(10) Patent No.: US 10,584,615 B2
(45) Date of Patent: *Mar. 10, 2020

(54) SYSTEM FOR GENERATING STEAM VIA TURBINE EXTRACTION AND COMPRESSOR EXTRACTION INCLUDING AN EJECTOR AND STATIC MIXER

(71) Applicant: General Electric Company, Schenectady, NY (US)

(72) Inventors: Alston Ilford Scipio, Mableton, GA (US); Sanji Ekanayake, Mableton, GA (US); Joseph Philip Klosinski, Kennesaw, GA (US); George Vargese Mathai, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 946 days.

This patent is subject to a terminal disclaimer.

(21) Appl. No.: 14/969,157

(22) Filed: Dec. 15, 2015

(65) Prior Publication Data

US 2017/0167304 A1 Jun. 15, 2017

(51) Int. Cl.
*F02C 6/08* (2006.01)
*F02C 7/18* (2006.01)
(Continued)

(52) U.S. Cl.
CPC ............... *F01K 23/10* (2013.01); *F01K 7/16* (2013.01); *F01K 15/00* (2013.01); *F01K 17/025* (2013.01);
(Continued)

(58) Field of Classification Search
CPC ...... F02C 9/18; F02C 6/04; F02C 6/08; F02C 6/18; F02C 7/12; F02C 7/18; F02C 7/185;
(Continued)

(56) References Cited

U.S. PATENT DOCUMENTS

| | | | | |
|---|---|---|---|---|
| 4,271,665 A | * | 6/1981 | Mandrin | F01K 23/10 60/39.17 |
| 5,392,595 A | * | 2/1995 | Glickstein | F02C 6/18 60/39.12 |

(Continued)

OTHER PUBLICATIONS

Co-pending U.S. Appl. No. 14/969,032, filed Dec. 15, 2015.
(Continued)

*Primary Examiner* — William H Rodriguez
(74) *Attorney, Agent, or Firm* — Charlotte C. Wilson; James W. Pemrick (57) ABSTRACT

A power plant includes an exhaust duct that receives an exhaust gas from an outlet of the turbine outlet and an ejector having a primary inlet fluidly coupled to a compressor extraction port. The ejector receives a stream of compressed air from the compressor via the compressor extraction port. The power plant further includes a static mixer having a primary inlet fluidly coupled to a turbine extraction port, a secondary inlet fluidly coupled to an outlet of the ejector and an outlet that is in fluid communication with the exhaust duct. A stream of combustion gas flows from a hot gas path of the turbine and into the inlet of the static mixer via the turbine extraction port. The static mixer receives a stream of cooled compressed air from the ejector to cool the stream of combustion gas upstream from the exhaust duct. The cooled combustion gas mixes with the exhaust gas within the exhaust duct to provide a heated exhaust gas mixture to a heat exchanger.

20 Claims, 3 Drawing Sheets

(51) Int. Cl.

| | |
|---|---|
| *F01K 23/10* | (2006.01) |
| *F01K 7/16* | (2006.01) |
| *F01K 15/00* | (2006.01) |
| *F01K 17/02* | (2006.01) |
| *F02C 7/141* | (2006.01) |
| *F02C 9/18* | (2006.01) |

(52) U.S. Cl.
CPC .............. *F02C 7/141* (2013.01); *F02C 6/08* (2013.01); *F02C 7/18* (2013.01); *F02C 9/18* (2013.01); *Y02E 20/14* (2013.01); *Y02E 20/16* (2013.01); *Y02P 80/15* (2015.11)

(58) Field of Classification Search
CPC .. F02C 7/224; F02C 3/34; F01D 25/30; F01D 25/305; F01K 23/10; F05D 2260/601
See application file for complete search history.

(56) References Cited

U.S. PATENT DOCUMENTS

| | | | | |
|---|---|---|---|---|
| 5,722,241 | A * | 3/1998 | Huber | F02C 7/143 |
| | | | | 415/114 |
| 5,867,987 | A | 2/1999 | Halimi et al. | |
| 6,098,395 | A * | 8/2000 | North | F01D 5/085 |
| | | | | 60/782 |
| 6,442,941 | B1 | 9/2002 | Anand et al. | |
| 6,543,234 | B2 | 4/2003 | Anand et al. | |
| 8,209,951 | B2 | 7/2012 | Hibshman, II | |
| 8,844,262 | B2 | 9/2014 | Sutterfield | |
| 9,103,279 | B2 | 8/2015 | Zhang et al. | |
| 2004/0045300 | A1* | 3/2004 | Dovali-Solis | F02C 6/18 |
| | | | | 60/778 |
| 2011/0162386 | A1* | 7/2011 | Chandrabose | F02C 3/32 |
| | | | | 60/785 |
| 2013/0247584 | A1* | 9/2013 | Kasibhotla | F01D 25/12 |
| | | | | 60/782 |
| 2013/0327012 | A1* | 12/2013 | Mahabub | F02C 7/047 |
| | | | | 60/39.093 |
| 2013/0340439 | A1* | 12/2013 | Ekanayake | F02C 7/047 |
| | | | | 60/779 |
| 2014/0102071 | A1* | 4/2014 | Ball, Jr. | F02C 6/06 |
| | | | | 60/39.52 |
| 2014/0123624 | A1* | 5/2014 | Minto | F23N 5/18 |
| | | | | 60/39.281 |
| 2014/0144124 | A1* | 5/2014 | Mazumder | F02C 7/047 |
| | | | | 60/39.093 |
| 2014/0305127 | A1* | 10/2014 | Schroder | F02C 6/16 |
| | | | | 60/772 |
| 2015/0010382 | A1* | 1/2015 | Subramaniyan | F02C 3/32 |
| | | | | 415/1 |
| 2015/0033751 | A1* | 2/2015 | Andrew | E21B 43/16 |
| | | | | 60/775 |
| 2015/0040574 | A1* | 2/2015 | Wichmann | F02C 3/34 |
| | | | | 60/773 |
| 2015/0059350 | A1* | 3/2015 | Kolvick | F02C 3/34 |
| | | | | 60/772 |
| 2015/0089955 | A1* | 4/2015 | Knapp | F02C 6/08 |
| | | | | 60/782 |
| 2015/0152791 | A1* | 6/2015 | White | F02C 9/26 |
| | | | | 60/773 |
| 2015/0226133 | A1* | 8/2015 | Minto | F02C 3/34 |
| | | | | 60/39.27 |
| 2015/0322861 | A1* | 11/2015 | Scipio | F02C 7/14 |
| | | | | 60/773 |
| 2016/0123190 | A1* | 5/2016 | Klosinski | F02C 6/04 |
| | | | | 60/772 |
| 2016/0273404 | A1* | 9/2016 | Ekanayake | F01K 23/10 |
| 2016/0273407 | A1* | 9/2016 | Ekanayake | F01K 23/103 |
| 2016/0273409 | A1* | 9/2016 | Ekanayake | F01K 23/105 |
| 2017/0074172 | A1* | 3/2017 | Little | F02C 6/08 |
| 2017/0152765 | A1* | 6/2017 | Uechi | F02C 7/185 |
| 2017/0167305 | A1* | 6/2017 | Scipio | F02C 6/18 |
| 2017/0167306 | A1* | 6/2017 | Scipio | F01K 23/10 |
| 2017/0167307 | A1* | 6/2017 | Scipio | F01K 23/10 |
| 2017/0167374 | A1* | 6/2017 | Klosinski | F02C 3/34 |
| 2017/0167375 | A1* | 6/2017 | Klosinski | F01D 25/305 |
| 2017/0167376 | A1* | 6/2017 | Klosinski | F01D 25/305 |
| 2017/0167377 | A1* | 6/2017 | Klosinski | F02C 6/06 |
| 2017/0167378 | A1* | 6/2017 | Klosinski | F01K 17/02 |
| 2017/0167379 | A1* | 6/2017 | Scipio | F01D 25/305 |
| 2017/0167380 | A1* | 6/2017 | Scipio | F01K 23/10 |
| 2017/0218852 | A1* | 8/2017 | Klosinski | F02C 9/18 |
| 2017/0342900 | A1* | 11/2017 | Scipio | F02C 7/057 |
| 2017/0342901 | A1* | 11/2017 | Scipio | F02C 7/08 |
| 2017/0342902 | A1* | 11/2017 | Scipio | F02C 7/08 |
| 2017/0342903 | A1* | 11/2017 | Scipio | F02C 7/08 |
| 2018/0216497 | A1* | 8/2018 | Klosinski | F01K 7/16 |
| 2018/0216499 | A1* | 8/2018 | Mathai | F01K 13/003 |

OTHER PUBLICATIONS

Co-pending U.S. Appl. No. 14/969,051, filed Dec. 15, 2015.
Co-pending U.S. Appl. No. 14/969,594, filed Dec. 15, 2015.
Co-pending U.S. Appl. No. 14/969,067, filed Dec. 15, 2015.
Co-pending U.S. Appl. No. 14/969,079, filed Dec. 15, 2015.
Co-pending U.S. Appl. No. 14/969,098, filed Dec. 15, 2015.
Co-pending U.S. Appl. No. 14/969,224, filed Dec. 15, 2015.
Co-pending U.S. Appl. No. 14/969,118, filed Dec. 15, 2015.
Co-pending U.S. Appl. No. 14/969,142, filed Dec. 15, 2015.
Co-pending U.S. Appl. No. 14/969,165, filed Dec. 15, 2015.
Co-pending U.S. Appl. No. 14/969,185, filed Dec. 15, 2015.
Co-pending U.S. Appl. No. 14/969,200, filed Dec. 15, 2015.

* cited by examiner

SYSTEM FOR GENERATING STEAM VIA TURBINE EXTRACTION AND COMPRESSOR EXTRACTION INCLUDING AN EJECTOR AND STATIC MIXER

FIELD OF THE INVENTION

The present invention generally relates to a gas turbine power plant such as a combined cycle or cogeneration power plant. More particularly, the present invention relates to a system for generating steam which uses combustion gas extracted from a turbine of the gas turbine and cooled by compressed air from a compressor.

BACKGROUND OF THE INVENTION

A gas turbine power plant such as a combined cycle or cogeneration power plant generally includes a gas turbine having a compressor, a combustor, a turbine, a heat recovery steam generator (HRSG) that is disposed downstream from the turbine and a steam turbine in fluid communication with the HRSG. During operation, air enters the compressor via an inlet system and is progressively compressed as it is routed towards a compressor discharge or diffuser casing that at least partially surrounds the combustor. At least a portion of the compressed air is mixed with a fuel and burned within a combustion chamber defined within the combustor, thereby generating high temperature and high pressure combustion gas.

The combustion gas is routed along a hot gas path from the combustor through the turbine where they progressively expand as they flow across alternating stages of stationary vanes and rotatable turbine blades which are coupled to a rotor shaft. Kinetic energy is transferred from the combustion gas to the turbine blades thus causing the rotor shaft to rotate. The rotational energy of the rotor shaft may be converted to electrical energy via a generator. The combustion gas exits the turbine as exhaust gas and the exhaust gas enters the HRSG. Thermal energy from the exhaust gas is transferred to water flowing through one or more heat exchangers of the HRSG, thereby producing superheated steam. The superheated steam is then routed into the steam turbine which may be used to generate additional electricity, thus enhancing overall power plant efficiency.

Regulatory requirements for low emissions from gas turbine based power plants have continually grown more stringent over the years. Environmental agencies throughout the world are now requiring even lower levels of emissions of oxides of nitrogen (NOx) and other pollutants and carbon monoxide (CO) from both new and existing gas turbines.

Traditionally, due at least on part to emissions restrictions, the gas turbine load for a combined cycle or cogeneration power plant has been coupled to or driven by steam production requirements for the power plant and not necessarily by grid power demand. For example, to meet power plant steam demand while maintaining acceptable emissions levels, it may be necessary to operate the gas turbine at full-speed full-load conditions, even when grid demand or power plant demand for electricity is low, thereby reducing overall power plant efficiency.

BRIEF DESCRIPTION OF THE INVENTION

Aspects and advantages of the invention are set forth below in the following description, or may be obvious from the description, or may be learned through practice of the invention.

One embodiment of the present invention is power plant. The power plant includes an exhaust duct disposed downstream from an outlet of a turbine for receiving exhaust gas from the turbine outlet and an ejector having a primary inlet fluidly coupled to a compressor extraction port. The ejector receives a stream of compressed air from the compressor via the compressor extraction port. The power plant also includes a static mixer having a primary inlet fluidly coupled to a turbine extraction port, a secondary inlet fluidly coupled to an outlet of the ejector and an outlet that is in fluid communication with the exhaust duct. A stream of combustion gas flows from a hot gas path of the turbine and into the inlet of the static mixer via the turbine extraction port. The static mixer receives a stream of cooled compressed air from the ejector to cool the stream of combustion gas upstream from the exhaust duct. The cooled combustion gas mixes with the exhaust gas within the exhaust duct to provide a heated exhaust gas mixture to a heat exchanger downstream from the exhaust duct.

Another embodiment of the present disclosure includes a power plant. The power plant includes a gas turbine having a compressor, a combustor downstream from the compressor and a turbine downstream from the combustor. The compressor includes a compressor extraction port disposed between an upstream end and a downstream end of the compressor. The turbine includes a first stage that is in fluid communication with a first turbine extraction port and a second stage that is in fluid communication with a second turbine extraction port. The first and second turbine extraction ports provide for extraction of a stream of combustion gas out of the turbine downstream from the combustor. An exhaust duct is disposed downstream from an outlet of the turbine and receives exhaust gas from the turbine outlet. The power plant further includes an ejector having a primary inlet that is fluidly coupled to the compressor extraction port and a static mixer having a primary inlet fluidly coupled to the first and second turbine extraction ports. The static mixer also includes a secondary inlet that is fluidly coupled to an outlet of the ejector and an outlet that is in fluid communication with the exhaust duct. The static mixer receives a stream of cooled compressed air from the ejector to cool the stream of combustion gas upstream from the exhaust duct. The cooled combustion gas mixes with the exhaust gas within the exhaust duct to provide a heated exhaust gas mixture to a heat exchanger.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

In a conventional co-generation power plant, fuel and air are supplied to a gas turbine. Air passes through an inlet of the gas turbine into the compressor section upstream of combustors in the gas turbine. After the air is heated by combustors, the heated air and other gases produced in the process (i.e., combustion gas) pass through the turbine section. The full volume of exhaust gas from the gas turbine passes from the turbine section to an exhaust section of the gas turbine, and flows to a heat recovery steam generator (HRSG) that extracts heat from the exhaust gas via one or more heat exchangers to produce steam.

In certain instances, the demand for steam may be lower than the amount of steam that could be generated by the gas turbine exhaust, some of the exhaust gas could be directed away from the heat recovery steam generator, such as being transported to an exhaust stack that filters the exhaust gas prior to being released into the atmosphere. Alternatively, if steam production is in higher demand than the steam generated by the gas turbine exhaust, then an increase in exhaust gas from the gas turbine could be produced to generate the steam desired.

The present embodiments provide a system to cool or temper hot combustion gas extracted directly from a turbine of a gas turbine prior to being mixed with exhaust gas flowing from an outlet of the turbine. Although the combustion gas is cooled via an ejector and a static mixer using compressed air extracted from the compressor, the cooled combustion gas is still significantly hotter than exhaust gas flowing from the turbine. As a result, the thermal energy from the cooled combustion gas raises the temperature of the exhaust gas upstream from a heat exchanger/boiler and/or heat recovery steam generator (HRSG), thereby enhancing steam production from the gas turbine. The steam may be piped to a steam turbine, used for heat production and/or for other industrial processes. The system can be used in a cogeneration system such that the cogeneration system can produce a higher quantity of steam without producing a proportional increase of power. The embodiment system thus provides an efficient use of the fuel input into the cogeneration system, and avoids wasteful production of undesired power by the gas turbine.

The embodiments provided herein provide various technical advantages over existing cogenerations or combined cycle power plants. For example, the system provided herein may include the ability to modulate steam production at a desired level while maintaining thermal and other operating efficiencies; the ability to provide a higher temperature gas to produce more steam downstream of the gas turbine; the ability to operate at a lower power output on the gas turbine and generate more steam; the ability to minimize wasteful products (i.e., producing unnecessary power in the gas turbine); and the ability to operate a cogeneration system at a more cost effective and efficient capacity.

Figure 1:
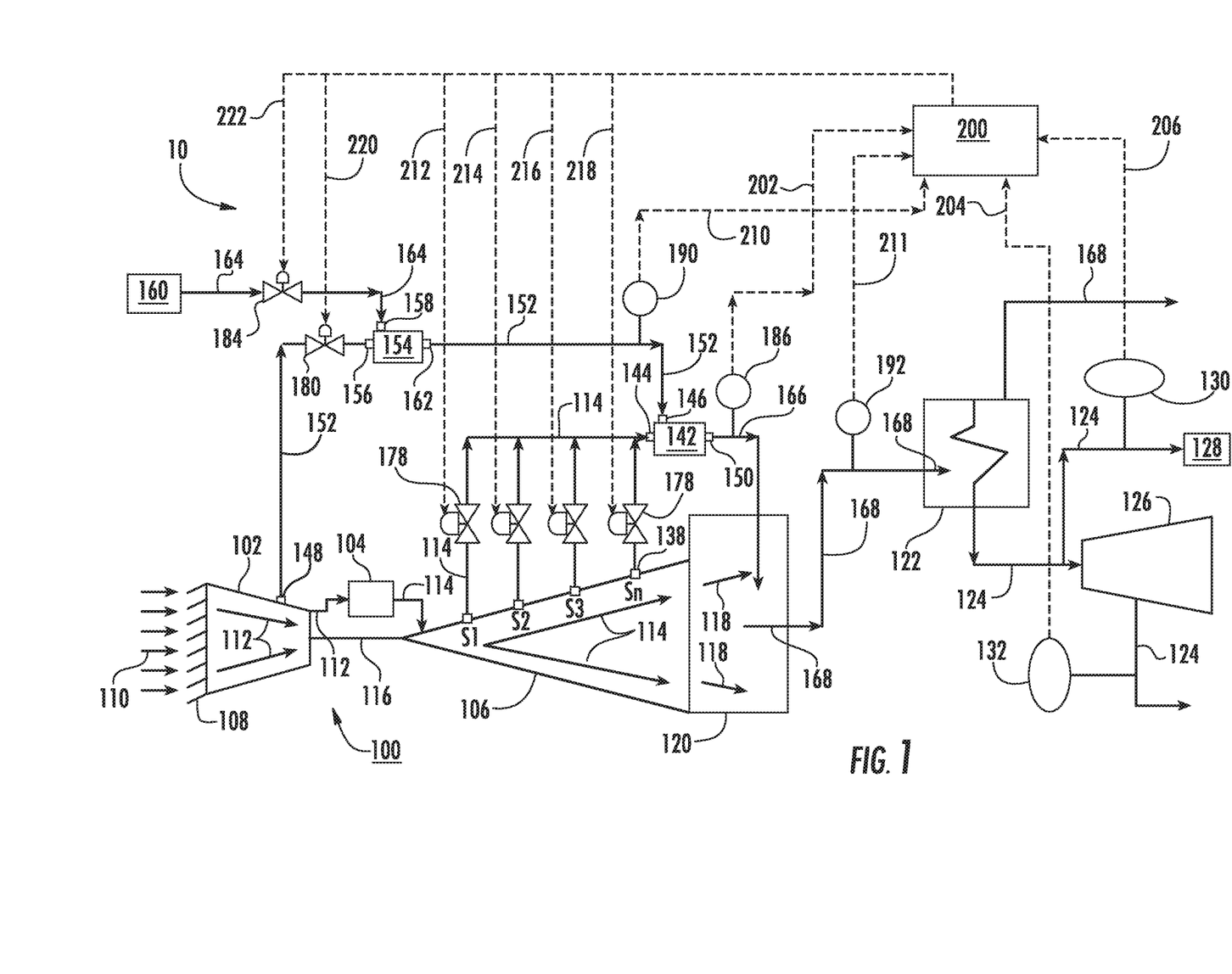
FIG. 1 is a schematic diagram of an exemplary gas turbine based cogeneration power plant according to one embodiment of the present invention.

Referring now to the drawings, wherein identical numerals indicate the same elements throughout the figures, FIG. 1 provides a functional block diagram of an exemplary gas turbine power plant 10 with steam production capability. The power plant 10 comprises a gas turbine 100 that may incorporate various embodiments of the present invention. The gas turbine 100 generally includes, in serial flow order, a compressor 102, a combustion section having one or more combustors 104 and a turbine 106. The gas turbine 100 may also include inlet guide vanes 108 disposed at an inlet or upstream end of the compressor 108. In operation, air 110 flows across the inlet guide vanes 108 and into the compressor 102. The compressor 102 imparts kinetic energy to the air 110 to produce compressed air as indicated schematically by arrows 112.

The compressed air 112 is mixed with a fuel such as natural gas from a fuel supply system to form a combustible mixture within the combustor(s) 104. The combustible mixture is burned to produce combustion gas as indicated schematically by arrows 114 having a high temperature, pressure and velocity. The combustion gas 114 flows through various turbine stages S1, S2, S3, Sn of the turbine 106 to produce work.

The turbine 106 may have two or more stages, for example, a low pressure section and a high pressure section. In one embodiment, the turbine 106 may be a two-shaft turbine that includes a low pressure section and a high pressure section. In particular configurations, the turbine 106 may have 4 or more stages. The turbine 106 may be connected to a shaft 116 so that rotation of the turbine 106 drives the compressor 102 to produce the compressed air 112. Alternately or in addition, the shaft 116 may connect the turbine 106 to a generator (not shown) for producing electricity. The combustion gas 114 loses thermal and kinetic energy as it flows through the turbine 106 and exits the turbine 106 as exhaust gas 118 via an exhaust duct 120 that is operably coupled to a downstream end of the turbine 106.

The exhaust duct 120 may be fluidly coupled to a heat exchanger or boiler 122 via various pipes, ducts, valves and the like. The heat exchanger 122 may be a standalone component or may be a component of a heat recovery steam generator (HRSG). In various embodiments, the heat exchanger 122 is used to extract thermal energy from the exhaust gas 118 to produce steam 124. In particular embodiments, the steam 124 may then be routed to a steam turbine 126 via various pipes, valves conduits or the like to produce additional power or electricity. At least a portion of the steam 124 may be piped from the heat exchanger 122 to an onsite or offsite facility 128 that distributes the steam to users and/or utilizes the steam for secondary operations such as heat production or other industrial operations or processes. In one embodiment, the steam 124 may be piped downstream from the steam turbine 126 and further utilized for various secondary operations such as heat production or other secondary operations.

Steam flow rate or output from the heat exchanger 122 may be monitored via one or more flow monitors. For example, in one embodiment, a flow monitor 130 may be provided downstream from the heat exchanger 122. In one embodiment, a flow monitor 132 may be disposed downstream from the steam turbine 126.

Figure 2:
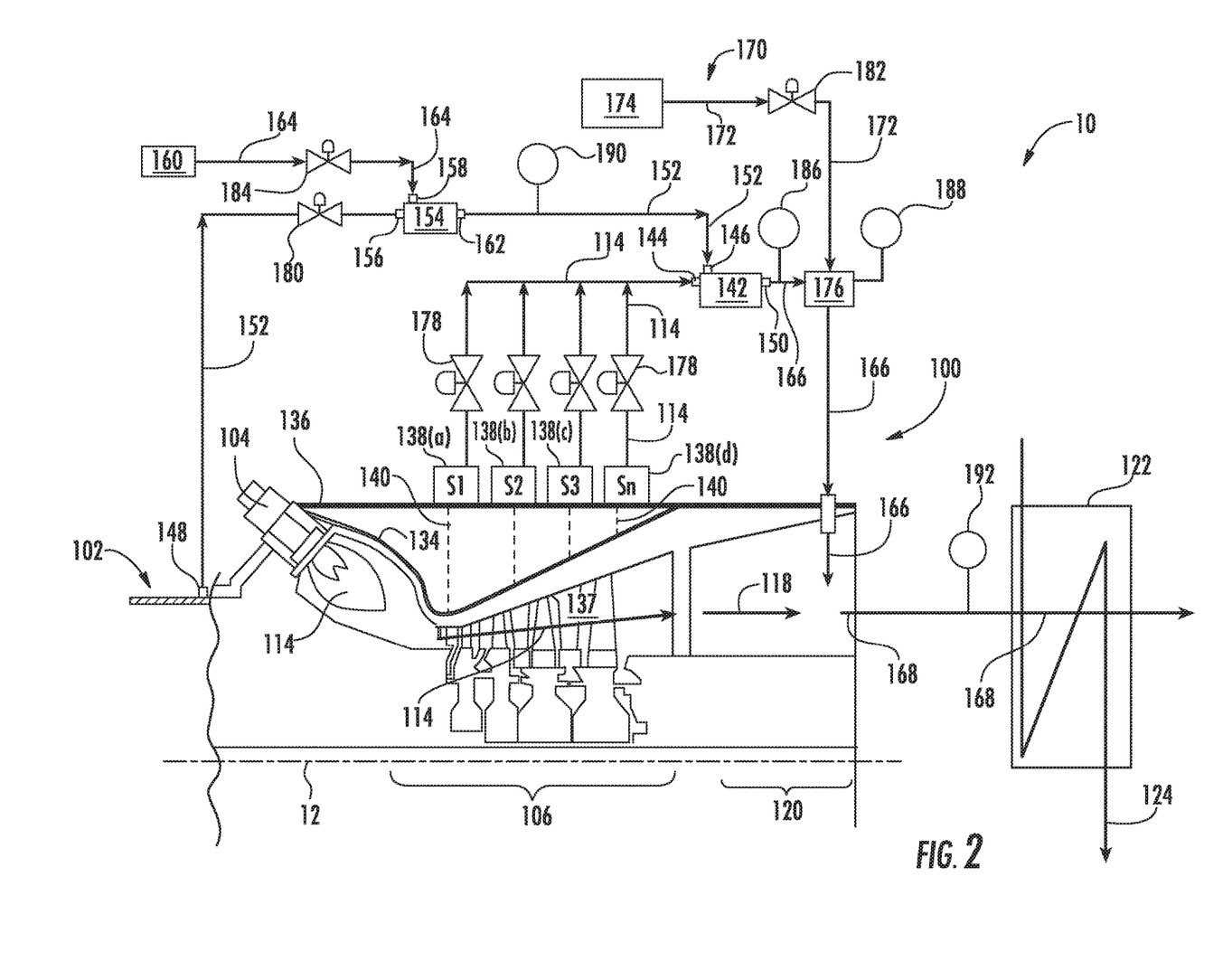
FIG. 2 is a simplified cross sectioned side view of a portion of an exemplary gas turbine according to at least one embodiment of the present invention.

FIG. 2 provides a simplified cross sectional side view of a portion of an exemplary gas turbine 100 including a portion of the compressor 102, the combustor 104, the turbine 106 and the exhaust duct 120 as may incorporate various embodiments of the present invention. In one embodiment, as shown in FIG. 2, the turbine 106 includes an inner turbine casing 134 and an outer turbine casing 136. The inner and outer turbine casings 134, 136 extend circumferentially about an axial centerline 12 of the gas turbine 100. The inner turbine casing 134 and/or or the outer turbine casing 136 at least partially encase sequential rows of stator vanes and rotor blades that make up the various stages S1, S2, S3, Sn of the turbine 106.

The turbine casings 134, 136 are normally sealed with only two openings: a combustion gas inlet at the upstream of the turbine 106, and an exhaust gas or turbine outlet at a downstream end of the turbine 106. The downstream end of the turbine 106 is operably connected to the exhaust duct 120. Conventionally, the entire volume of combustion gas 114 passes through a hot gas path 137 defined by the various stages of the turbine 106 within the inner and outer turbine casings 134, 136, into the exhaust duct 120 and at least a portion of the exhaust gas 118 may be directed to the heat exchanger 122.

During operation, if it is determined that the demand for steam production is higher than the demand for power produced by the gas turbine 100 a portion of the combustion gas 114 may be extracted from one or more of the turbine stages S1, S2, S3, Sn via one or more corresponding turbine extraction ports 138 as shown in FIG. 2. Four turbine extraction ports 138(a-d) are shown for illustration. However, the turbine 106 may include any number of turbine extraction ports 138. For example, the turbine 106 may include one turbine extraction port 138, two turbine extraction ports 138, three turbine extraction ports 138 or four or more turbine extraction ports 138.

Each turbine extraction port 138 may be fluidly coupled to and/or in fluid communication with one or more of the turbine stages S1, S2, S3, Sn. Each turbine extraction port 138 may provide a flow path for a stream of the combustion gas 114 to flow out of the turbine 106 from a point that is downstream from the combustor 104 but upstream from the exhaust duct 120.

As shown in FIG. 2, one or more of the turbine extraction ports 138(a-d) may be in fluid communication with one or more of the turbine stages S1, S2, S3 or Sn via one or more extraction pipes 140. The extraction pipes 140 and the turbine extraction ports 138 provide for fluid communication of the combustion gas 114 from the hot gas path 137, through the inner and/or outer turbine casings 134, 136 and out of the turbine 106 to obtain a portion of the combustion gas 114 at higher temperatures than the exhaust gas 118 flowing into the exhaust duct 120 from outlet of the turbine 106.

As shown in FIG. 2, the turbine stages S1, S2, S3 and Sn are successive such that the combustion gas 114 flows through the stages from S1 to a last stage Sn. Turbine stage S1 is the first stage and receives hot combustion gas 114 directly from the combustor 104. Temperature of the combustion gas 114 decreases with each successive stage. For example, the combustion gas 114 at the S1 turbine stage has a higher temperature than at the subsequent turbine stages, S2, S3, Sn, etc. . . . . The exhaust gas 118 is at a lower temperature than the combustion gas 114 within the turbine 106 and therefore has less thermal energy.

Figure 3:
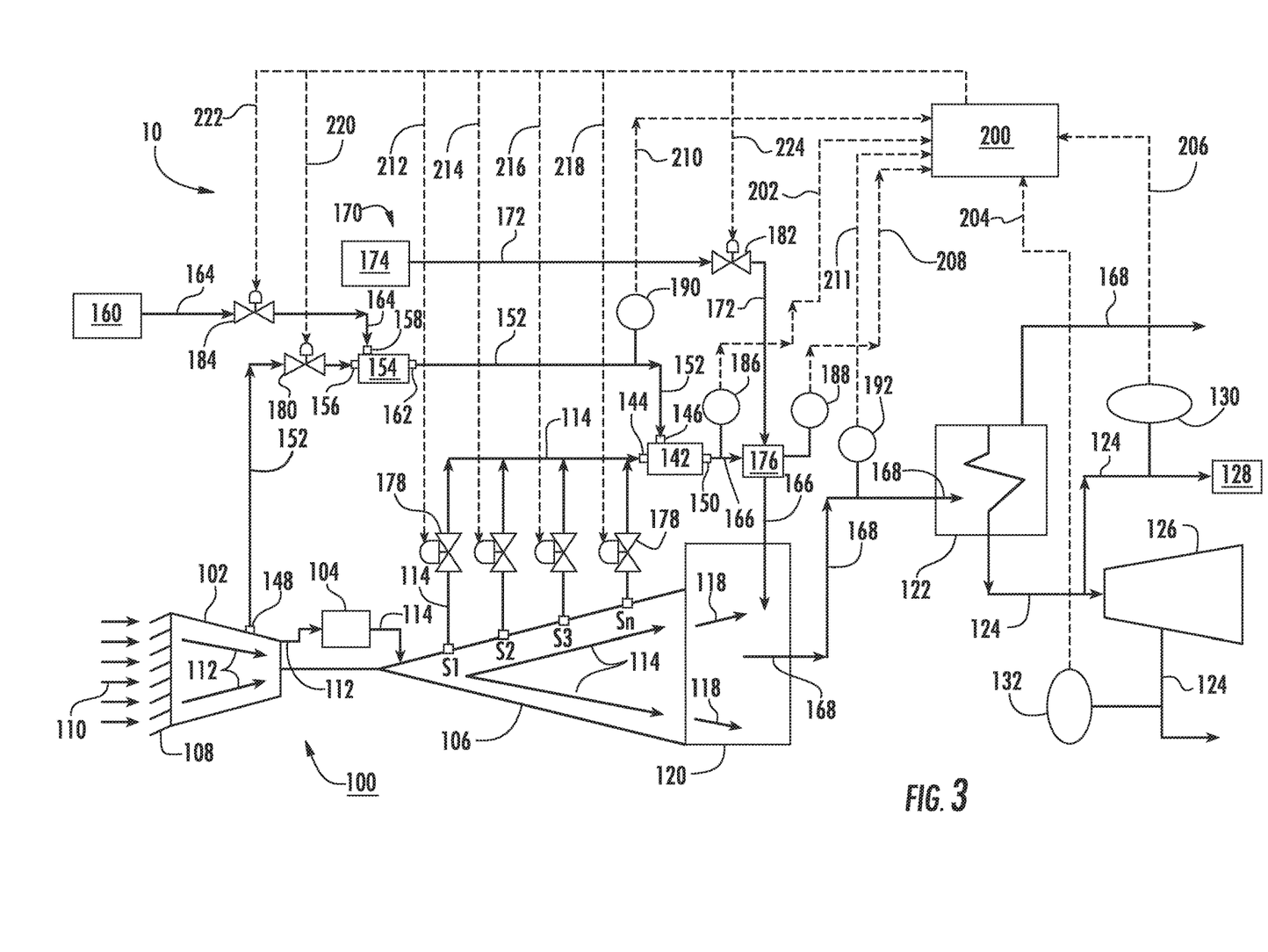
FIG. 3 is a schematic diagram of the exemplary gas turbine based cogeneration power plant as shown in FIG. 1, according to one embodiment of the present invention.

FIG. 3 provides a functional block diagram of the exemplary gas turbine power plant 10 with steam production capability as shown in FIG. 1, according to one embodiment of the present invention. In one embodiment, as shown in FIGS. 1, 2 and 3, the power plant 10 includes a static mixer 142. The static mixer 142 includes a primary inlet 144 fluidly coupled to one or more of the one or more turbine extraction ports 138, a secondary inlet 146 fluidly coupled to one or more compressor extraction ports 148 and an outlet 150 in fluid communication with the exhaust duct 120. The static mixer 142 generally includes individual mixing elements stacked in series within an outer casing or pipe and in fluid communication with the primary and secondary inlets 144, 146 and with the outlet 150. Each mixing element may be oriented relative to an adjacent mixing element to homogenize two or more fluids flowing through static mixer 142.

The compressor extraction port(s) 148 provide a flow path for a portion of the compressed air 152 to flow out the compressor 102 at a point between an upstream or inlet to the compressor 104 and an outlet of the compressor 104 that is defined upstream or immediately upstream from the combustor 102. Because the compressed air 112 increases in pressure and temperature from the inlet to the outlet, the compressor extraction port(s) 148 may be axially spaced along the compressor 102 at various points to capture a portion of the compressed air 152 at a desired temperature and pressure.

In particular embodiments, an ejector 154 is disposed downstream from the compressor extraction port(s) 148 and upstream from the secondary inlet 146 of the static mixer 142. The ejector 154 may be fluidly coupled to the compressor extraction port(s) 148 and to the secondary inlet 146 of the static mixer 142 via various pipes, conduits, valves or the like. The ejector 154 includes a primary inlet 156 fluidly coupled to the compressor extraction port(s) 148, a suction inlet 158 in fluid communication with an air supply 160 and an outlet 162 in fluid communication with the secondary inlet 146 of the static mixer 142.

In operation, the extracted combustion gas 114 from the one or more turbine extraction ports 138 flows into the static mixer 142 via primary inlet 144. A portion of the compressed air 152 extracted from the compressor extraction port(s) 148 flows from compressor extraction port(s) 148 and acts as a motive fluid flowing through the ejector 154. Air 164, such as ambient air supplied by the air supply 160 cools the stream of compressed air 152 upstream from the secondary inlet 146 of the static mixer 142. The air 164 flowing into the ejector 154 may also increase air mass flow from the compressor extraction port(s) 148 into the static mixer 142.

Because the compressed air 152 downstream from the ejector 154 is cooler than the combustion gas 114 flowing into the static mixer 142, the stream of combustion gas 114 is cooled as it mixes with the compressed air 152 within the static mixer 142. The mixing elements may divide and recombine the compressed air 152 and the extracted combustion gas 114 such that a stream of cooled combustion gas 166 exiting the static mixer 142 outlet 150 is homogeneous with regard to concentration, temperature and velocity which are equalized throughout the entire pipe cross-section. In addition to cooling the combustion gas 114 upstream from the exhaust duct 120, the compressed air 152 may also increase mass flow from the static mixer 142 into the exhaust duct 120.

The cooled combustion gas 166 flowing from the static mixer 142 outlet 150 is at a higher temperature than the exhaust gas 118. As a result, thermal energy from the cooled combustion gas 166 is transferred to the exhaust gas 118 within the exhaust duct 120 to provide a heated exhaust gas mixture 168 to the heat exchanger 126 disposed downstream from the exhaust duct 120. By increasing the temperature of the exhaust gas 118, steam production capability of the power plant 10 may be enhanced, particularly at gas turbine low-load or turn-down operating conditions.

In particular embodiments, as shown in FIGS. 2 and 3, the power plant 10 further comprises a coolant injection system 170 disposed downstream from the static mixer outlet 150 and upstream from the exhaust duct 120. The coolant injection system 170 may include spray nozzles, a spray tower, a scrubber or other various components (not shown) configured to inject a coolant 172 from a coolant supply 174 into the stream of cooled combustion gas 166 flowing from the static mixer 142, thereby further cooling the cooled combustion gas 166 upstream from the exhaust duct 120.

In particular embodiments, as shown in FIGS. 2 and 3, the coolant injection system 170 may include a mixing chamber 176 fluidly coupled to and positioned downstream from the outlet 150 of the static mixer 142. The mixing chamber 176 may be fluidly coupled to the exhaust duct 120 via various pipes, conduits, valves or the like. The mixing chamber 176 may be configured to receive the stream of cooled combustion gas 166 from the static mixer 142 outlet 150 and pass the cooled combustion gas 166 on to the exhaust duct 120 upstream from the heat exchanger 122. In particular embodiments, the mixing chamber 176 may be fluidly coupled directly to the heat exchanger 122 and/or the HRSG via various pipes, conduits, valves or the like.

In particular embodiments, the coolant 172 and the cooled combustion gas 166 are mixed upstream from the exhaust duct 120 in the mixing chamber 176. In this manner, the coolant 172 may be used to further reduce or control the temperature of the cooled combustion gas 166 upstream from the heat exchanger 122 and/or the exhaust duct 120. The coolant 172 may be any liquid or gas that may be mixed with the cooled combustion gas 166 for its intended purpose. In one embodiment, the coolant 172 comprises water. In one embodiment the coolant 172 comprises steam.

Referring to FIGS. 1 and 3, a controller 200 may be used to determine the desired steam production capacity and to generate and/or send appropriate control signals to various control valves 178 fluidly coupled to one or more of the turbine extraction ports 138, one or more control valves 180 disposed between the compressor extraction port 148 and the secondary inlet 146 of the static mixer 142 and/or to one or more control valves 182 (FIG. 3) of the coolant injection system 160 and/or to one or more control valves 184 (FIGS. 1 & 3) disposed upstream from the suction inlet 158 of the ejector 154. The controller 200 may be a microprocessor based processor that includes a non-transitory memory and that has the capability to calculate algorithms.

The controller 200 may incorporate a General Electric SPEEDTRONIC™ Gas Turbine Control System, such as is described in Rowen, W. I., "SPEEDTRONIC™ Mark V Gas Turbine Control System", GE-3658D, published by GE Industrial & Power Systems of Schenectady, N.Y. The controller 200 may also incorporate a computer system having a processor(s) that executes programs stored in a memory to control the operation of the gas turbine using sensor inputs and instructions from human operators.

In particular embodiments, the controller 200 is programmed to determine a desired temperature of exhaust gas required to generate the desired amount of steam flow, and to regulate one or more of combustion gas flow through valve(s) 178, compressed air flow through valve(s) 180, coolant flow through valve(s) 182 and air flow to the ejector 154 through valve 184 to achieve the desired temperature of the exhaust gas mixture 168 being sent to the heat exchanger 122.

The controller 200 may receive input data signals, such as combustion gas temperature 202 from a temperature monitor 186 (FIGS. 1-3) disposed downstream from the static mixer outlet 150, and/or combustion gas temperature 208 from a temperature monitor 188 (FIGS. 2-3) disposed at or downstream from the mixing chamber 116 and/or compressed air temperature 210 from a temperature monitor 190 (FIGS. 2-3) disposed at or downstream from the ejector 154 and upstream from the static mixer 142 and/or exhaust gas mixture temperature 211 from a temperature monitor 192 (FIGS. 1-3) disposed at or downstream from the exhaust duct 120 and/or at or upstream from the heat exchanger 122.

The controller 200 may also receive steam flow data 204 from flow monitor 132 and/or steam flow data 206 from flow monitor 130. In response to one or more data signals 202, 204, 206, 208, 210, 211 the controller 200 may actuate one or more of valve(s) 178, 180, 182, 184 to control combustion gas flow from the turbine stages S1-Sn, compressed air flow rate from the compressor extraction port(s) 148 into the ejector 154 and the static mixer 142 secondary inlet 146, coolant flow rate from the coolant supply 174 and/or air flow rate into the suction inlet 158 of the ejector 154 to produce the desired temperature of the exhaust gas mixture 168.

Steam flow output from the steam turbine 126 may be monitored using flow monitor 132. Steam flow output to secondary operations may be monitored using flow monitor 130. Controller 200 may actuate one or more of valve(s) 178, 180, 182, 184 to control at least one of combustion gas flow from the turbine stages S1-Sn, compressed air flow rate from the compressor extraction port(s) 148 into the ejector 154 and the static mixer 142 secondary inlet 146, coolant flow rate from the coolant supply 174 and/or air flow rate into the suction inlet 158 of the ejector 154 to produce the desired temperature of the exhaust gas mixture 168 to provide a desired steam output from the heat exchanger 122 based at least in part on flow output as measured by at least one of flow monitors 130, 132.

Data signals received by the controller 200, such as combustion gas temperature, exhaust gas temperature and steam flow rate, may be analyzed to compare with a predetermined desired amount of steam flow. The controller 200 may use the received data signals to determine if an increase in exhaust gas temperature would be desired. Calculations include determining the quantity of steam needed and the amount of power desired, and determining the temperature and quantity of combustion gas needed to produce the desired quantity of steam.

After determining the desired temperature and quantity of combustion gas 114 required for the heat exchanger 122 to produce desired steam quantity, the controller 200 may generate and send one or more signals 212, 214, 216, 218, to the receiver of the appropriate valve(s) 178 to extract combustion gas 114 through the turbine casings 134, 136 at the appropriate turbine stage S1, S2, S3, Sn. In addition, the controller 200 may send a signal 220 to the receiver of valve 180 to control the flow rate of the compressed air 152 extracted from the compressor 102 and sent into the ejector 154. The controller may also send a signal 222 to control valve 184 to control the flow rate of air 164 into the suction inlet 158 of the ejector 154. The controller 200 may also send a signal 224 to valve 182 to modulate flow of the coolant 172 at a desired amount into the mixing chamber 176 and/or into the stream of cooled combustion gas 166 from the static mixer 142 to further cool the cooled combustion gas 166 to a desired temperature. The system or systems provided herein automatically blend the exhaust gas 118 with the stream of cooled combustion gas 166 so that the exhaust gas mixture temperature is above a nominal exhaust gas temperature but below the thermal limits of the heat exchanger 122 or HRSG.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed:

1. A power plant, comprising:
an exhaust duct downstream from an outlet of a turbine, wherein the exhaust duct receives exhaust gas from the turbine outlet;
an ejector having a primary inlet fluidly coupled to a compressor extraction port, wherein the ejector receives a stream of compressed air from the compressor via the compressor extraction port; and
a static mixer having a primary inlet fluidly coupled to a turbine extraction port, a secondary inlet fluidly coupled to an outlet of the ejector and further comprising an outlet in fluid communication with the exhaust duct, wherein a stream of combustion gas flows from a hot gas path of the turbine and into the inlet of the static mixer via the turbine extraction port;
wherein the static mixer receives a stream of cooled compressed air from the ejector to cool the stream of combustion gas upstream from the exhaust duct, wherein the cooled combustion gas mixes with the exhaust gas within the exhaust duct to provide a heated exhaust gas mixture to a heat exchanger.

2. The power plant as in claim 1, wherein the heat exchanger extracts thermal energy from the exhaust gas mixture to produce steam.

3. The power plant as in claim 1, further comprising a steam turbine disposed downstream from the heat exchanger.

4. The power plant as in claim 1, wherein the ejector includes a suction inlet in fluid communication with an air supply.

5. The power plant as in claim 1, further comprising a coolant injection system disposed downstream from the static mixer outlet and upstream from the exhaust duct, wherein the coolant injection system injects a coolant into the stream of cooled combustion gas flowing from the static mixer outlet.

6. The power plant as in claim 5, wherein the coolant is water.

7. The power plant as in claim 5, wherein the coolant is steam.

8. The power plant as in claim 1, further comprising a controller electronically coupled to a first control valve fluidly connected between the turbine extraction port and the static mixer inlet and a second control valve disposed upstream from the secondary inlet of the static mixer.

9. The power plant as in claim 8, further comprising a temperature monitor electronically coupled to the controller and in thermal communication with the turbine extraction port upstream from the exhaust duct, wherein the controller actuates at least one of the first control valve to increase or decrease the stream of combustion gas from the turbine and the second control valve to increase or decrease mass flow through the secondary inlet of the static mixer in response to a data signal provided by the temperature monitor to the controller.

10. The power plant as in claim 8, further comprising a steam flow monitor disposed downstream from the heat exchanger and electronically coupled to the controller, wherein the controller actuates at least one of the first control valve and the second control valve in response to a flow output signal provided to the controller by the steam flow monitor.

11. A power plant, comprising:
a gas turbine having a compressor, a combustor downstream from the compressor and a turbine downstream from the combustor, the compressor including a compressor extraction port disposed between an upstream end and a downstream end of the compressor, the turbine including a first stage in fluid communication with a first turbine extraction port and a second stage in fluid communication with a second turbine extraction port, wherein the first and second turbine extraction ports provide for extraction of a stream of combustion gas out of the turbine downstream from the combustor;
an exhaust duct downstream from an outlet of the turbine, wherein the exhaust duct receives exhaust gas from the turbine outlet;
an ejector having a primary inlet fluidly coupled to the compressor extraction port; and
a static mixer having a primary inlet fluidly coupled to the first and second turbine extraction ports, a secondary inlet fluidly coupled to an outlet of the ejector and further comprising an outlet in fluid communication with the exhaust duct;
wherein the static mixer receives a stream of cooled compressed air from the ejector to cool the stream of combustion gas upstream from the exhaust duct, wherein the cooled combustion gas mixes with the exhaust gas within the exhaust duct to provide a heated exhaust gas mixture to a heat exchanger.

12. The power plant as in claim 11, wherein the heat exchanger extracts thermal energy from the exhaust gas mixture to produce steam.

13. The power plant as in claim 11, further comprising a steam turbine disposed downstream from the heat exchanger.

14. The power plant as in claim 11, wherein the ejector includes a suction inlet in fluid communication with an air supply.

15. The power plant as in claim 11, further comprising a coolant injection system disposed downstream from the static mixer outlet and upstream from the exhaust duct, wherein the coolant injection system injects a coolant into the stream of cooled combustion gas flowing from the static mixer outlet.

16. The power plant as in claim 15, wherein the coolant is water.

17. The power plant as in claim 15, wherein the coolant is steam.

18. The power plant as in claim 11, further comprising a controller electronically coupled to a first control valve fluidly connected between the first turbine extraction port and the static mixer inlet, a second control valve fluidly connected between the second turbine extraction port and the static mixer inlet, a third control valve disposed upstream from the secondary inlet of the static mixer.

19. The power plant as in claim 18, further comprising a temperature monitor electronically coupled to the controller and disposed downstream from the static mixer outlet, wherein the controller actuates at least one of the first and second control valves to increase or decrease the stream of combustion gas from the turbine and actuates the third control valve to increase or decrease mass flow through the secondary inlet of the static mixer in response to a data signal provided to the controller by the temperature monitor.

20. The power plant as in claim 18, further comprising a flow monitor disposed downstream from the heat exchanger and electronically coupled to the controller, wherein the controller actuates at least one of the first control valve, the second control valve and the third control valve in response to a flow output signal provided by the flow monitor to the controller.

* * * * *